(12) United States Patent
Takamura

(10) Patent No.: US 6,259,360 B1
(45) Date of Patent: Jul. 10, 2001

(54) PRESSURE MONITOR FOR VEHICLE TIRE

(75) Inventor: Yoshinori Takamura, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/399,001

(22) Filed: Sep. 20, 1999

(30) Foreign Application Priority Data

Sep. 21, 1998 (JP) .................................................. 10-266973

(51) Int. Cl.⁷ .................................................. B60C 23/00
(52) U.S. Cl. ........................... 340/445; 340/447; 340/442
(58) Field of Search .................................... 340/445, 447, 340/442; 73/146.5, 146.3; 200/61.22, 61.25; 116/34 R

(56) References Cited

U.S. PATENT DOCUMENTS

| | | | |
|---|---|---|---|
| 4,909,074 | * 3/1990 | Gerresheim et al. | 340/445 |
| 5,285,189 | 2/1994 | Nowicki et al. | 340/447 |
| 5,559,484 | 9/1996 | Nowicki et al. | 340/447 |
| 5,600,301 | 2/1997 | Robinson, III | 340/442 |
| 5,774,048 | 6/1998 | Achterholt | 340/447 |
| 5,900,809 | * 5/1999 | Hebert | 340/442 |
| 5,965,808 | * 10/1999 | Normann et al. | 340/447 |
| 6,112,165 | * 8/2000 | Uhl et al. | 340/447 |

FOREIGN PATENT DOCUMENTS

| | | |
|---|---|---|
| 8-227492 | 9/1996 | (JP) . |
| 9-30220 | 2/1997 | (JP) . |
| WO 94/06640 | 3/1994 | (WO) . |
| WO 96/06747 | 3/1996 | (WO) . |

* cited by examiner

Primary Examiner—Daniel J. Wu
Assistant Examiner—John Tweel, Jr.
(74) Attorney, Agent, or Firm—Finnegan, Henderson, Farabow, Garrett & Dunner, L.L.P

(57) ABSTRACT

The present invention offers a pressure monitor and a method of controlling the pressure monitor for a vehicle tire which enable reducing electric power consumption and issuing an alarm, when the tire pressure is equal to or lower than a predetermined alarm tire pressure. The pressure monitor comprises a signal sending device and a signal receiving device. The signal sending device includes a tire pressure sensor and a battery. The tire pressure sensor detects a tire pressure at each interval time, a predetermined unit time $\delta t$. The signal sending device sends an electric signal to the signal receiving device. The signal receiving device receives the electric signal from the signal sending device and issues an alarm when the detected tire pressure is equal to or lower than a predetermined tire pressure P1, P2 and P3 (P1>P2>P3). The signal sending device is installed on a wheel and is driven by the battery. The signal sending device sends the electric signal of the tire pressure detected by the tire pressure sensor at periodical interval $\Delta T$ and sends at the time when a change in the value of the detected tire pressure in the interval $n2 \times \delta t$ is equal to or more than the value of $n2 \times \delta pt$. The number $n2$ is set to satisfy with $0 < n2 \leq n1$ ($n1 = \Delta T/\delta t$). The predetermined standard value $\delta pt$ is, for example, set to satisfy an equation $\delta pt = $(a normal tire pressure-the first alarm tire pressure)/$n1$.

11 Claims, 3 Drawing Sheets

PRESSURE MONITOR FOR VEHICLE TIRE

FIELD OF THE INVENTION

The present invention relates to a pressure monitor and a method of controlling the pressure monitor for a tire on a vehicle. The pressure monitor comprises a signal receiving device and a signal sending device including a tire pressure sensor and a battery.

BACKGROUND OF THE INVENTION

One example of a pressure monitor for a vehicle tire is disclosed in Japanese Laid-Open Patent Application No. 9-30220. This conventional pressure monitor comprises a signal sending device installed on a wheel of a vehicle for sending an electric wireless signal indicating a tire pressure at predetermined intervals, and a signal receiving device installed on a body of the vehicle for receiving the electric wireless signal sent by the signal sending device. Consequently, the conventional pressure monitor keeps watch on the tire pressure of the vehicle, and can issue an alarm when the tire pressure is less than a predetermined alarm tire pressure.

The signal sending device of the conventional pressure monitor is attached to the wheel, and a battery, which is a power source for the signal sending device, is contained in the signal sending device. Electric power is consumed when the signal sending device sends an electric signal. Therefore, it is desirable to restrain the signal sending frequency in order to lengthen the life of the battery. Consequently, the pressure monitor adopts such a control as, when the detected tire pressure changes a little bit, the signal sending device interrupts to send the electric signal of the detected tire pressure.

In such an above-mentioned control, however, in the case that the tire pressure, which is equal to or marginally higher than the alarm tire pressure, gradually decreases (at a small changing rate), the electric signal of the tire pressure will not be sent, even though the present tire pressure is lower than the alarm tire pressure. The signal receiving device, thus, does not issue an alarm in such a necessary situation.

SUMMARY OF THE INVENTION

It is thus an object of the present invention to solve the aforementioned problems. It provides a pressure monitor and a method of controlling the pressure monitor for a vehicle tire which reduces the electric power consumed by a signal sending device in the pressure monitor and at the same time enables the pressure monitor to issue an alarm reliably when the tire pressure is lower than an alarm tire pressure.

To achieve at least a part of the aforementioned objects, a pressure monitor and a method of controlling the pressure monitor for a vehicle tire of the present invention have found a solution, which will now be described.

A pressure monitor for a vehicle tire has a signal sending device and a signal receiving device. The signal sending device includes a battery and a tire pressure sensor, and sends an electric signal in response to a tire pressure detected by the pressure sensor. The signal receiving device receives the electric signal sent by the signal sending device. Furthermore, the signal sending device sends electric signals at predetermined sending intervals and sends an electric signal if a change in the value of the tire pressure in a predetermined unit of time is equal to or more than a predetermined standard value.

Since the signal sending device sends electric signals at predetermined sending intervals in this pressure monitor, the signal receiving device can detect the tire pressures from the electric signals at least at predetermined intervals. If the change in the value of the tire pressure in the unit time is equal to or more than the standard value, the tire pressure might not be normal. Since the electric signal of the detected tire pressure is sent by the signal sending device even though in such a case, the signal receiving device can detect the abnormality of the tire pressure. If the change is less than the standard value, the signal sending device sends the signal only at the periodical intervals. Then, the pressure monitor can save electric power consumed by the signal sending device.

Furthermore, the signal sending device sends the electric signal to the signal receiving device if an average of the change in the value of the tire pressure in a standard time is equal to or more than the standard value. The standard time can be determined to be equal to $n2 \times \delta t$ by selecting a value $n2$ which is equal to or less than $n1$ ($=\Delta T/\delta t$) calculated from the predetermined sending interval $\Delta T$ and the predetermined unit time $\delta t$, and multiplying the value $n2$ by the predetermined unit time $\delta t$.

The signal receiving device further includes at least one alarm for issuing an alarm on the basis of comparing the tire pressure detected by the tire pressure sensor with a predetermined alarm tire pressure. The signal receiving device issues an alarm when the detected tire pressure is equal to or less thin the predetermined alarm tire pressure. Then the pressure monitor can reliably issue an alarm, when the detected tire pressure becomes equal to or less than the alarm tire pressure.

In this pressure monitor, the standard value is determined on the basis of the predetermined sending intervals and the predetermined alarm tire pressure. Therefore, the standard value can be set to be a value by which the signal receiving device can swiftly catch the time when the tire pressure is equal to or lower than the alarm tire pressure. Consequently, the signal sending device sends the electric signal, only when the alarm should be issued with high possibility. Then, consumed electric power of the sending signal device becomes further lower.

In the case that a plurality of alarm pressures are provided in the signal receiving device, the standard value can be determined on the basis of the tire pressure which is equal to or more than the minimum value among a difference between a predetermined normal tire pressure and the highest alarm tire pressure and the differences between pairs of successive alarm tire pressures. The standard value can also be determined on the basis of the tire pressure which is equal to or less than the difference between the predetermined normal tire pressure and the lowest alarm tire pressure.

BRIEF DESCRIPTION OF THE DRAWINGS

The above and other objects, features, advantages and technical and industrial significance of this invention will be better understood by reading the following detailed description of a presently preferred embodiment of the invention, when considered in connection with the accompanying drawing, in which.

DESCRIPTION OF THE PREFERRED EMBODIMENTS

Figure 1:
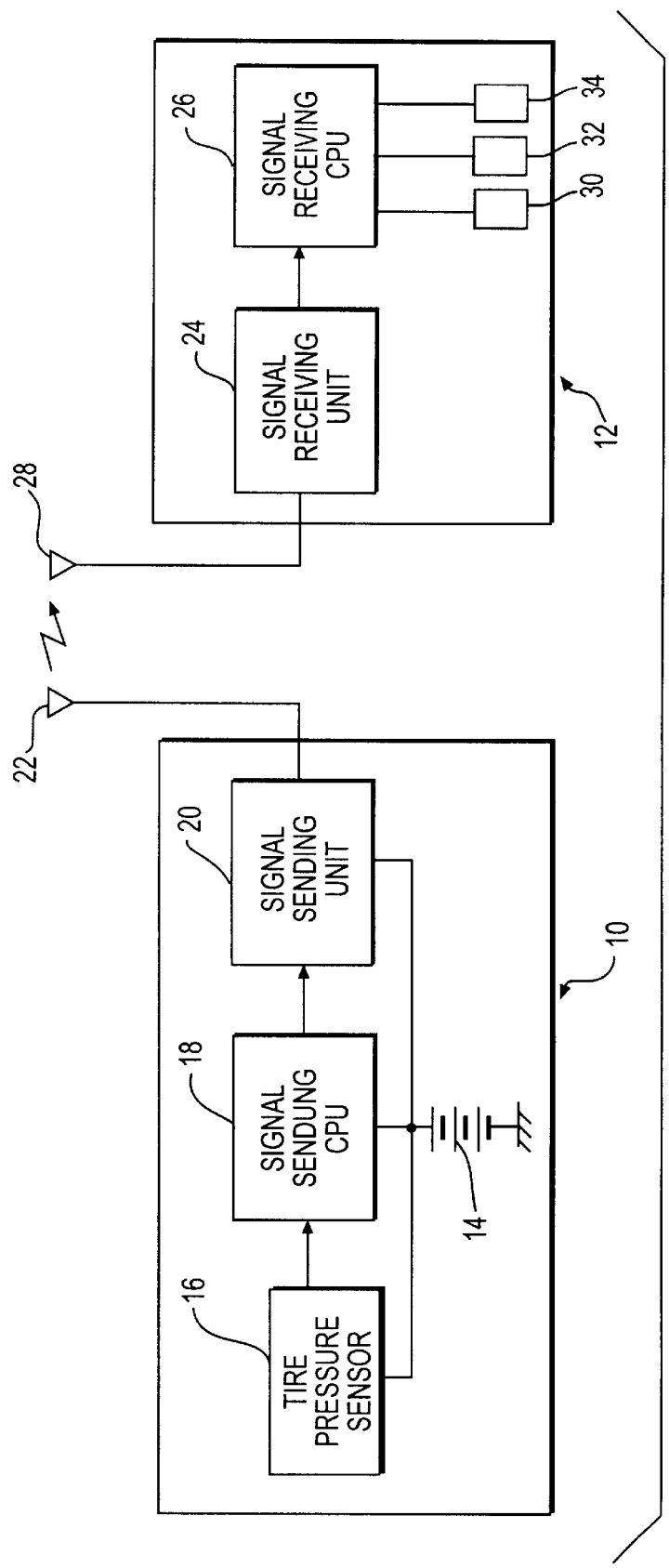
FIG. 1 is a block diagram showing a signal sending device and a signal receiving device of a pressure monitor, as one embodiment of the present invention.

In the following and the accompanying drawings, the present invention will be described in more detail in terms of the embodiments. FIG. 1 shows a block diagram of a signal sending device and a signal receiving device of a pressure monitor, as one embodiment of the present invention. In this embodiment, a tire pressure of a tire installed on a vehicle is first set to be normal tire pressure P0. The pressure monitor keeps watch on the tire pressure. If the tire pressure becomes lower than a predetermined alarm tire pressure, the pressure monitor issues an alarm and notifies a driver that the tire pressure is not normal.

As shown in FIG. 1, a pressure monitor of this embodiment comprises a signal sending device 10 and a signal receiving device 12. The signal sending device 10 is deposited inside of a wheel, and is driven by a battery 14 contained in the signal sending device 10. Referring to FIG. 1, the signal sending device 10 includes a tire pressure sensor 16, a signal sending CPU 18, a signal sending unit 20, and the battery 14. The tire pressure sensor 16 outputs an electric signal in response to the tire pressure of the vehicle tire. The electric signal from the tire pressure sensor 16 is sent to the signal sending CPU 18. The signal sending CPU 18 detects the tire pressure on the basis of the output electric signal and outputs an electric signal of a detected tire pressure Pm to the signal sending unit 20. The signal sending unit 20 sends an electric wireless signal from a sending antenna 22.

The receiving device 12 is provided in a body of the vehicle, and is driven by a battery installed on the vehicle. As illustrated in FIG. 1, the signal receiving device 12 has a signal receiving unit 24, a signal receiving CPU 26, and a plurality of alarms 30, 32 and 34. The signal receiving unit 24 receives the electric wireless signal from the signal sending device 10 through a receiving antenna 28. The signal receiving unit 24 outputs the detected tire pressure Pm to the signal receiving CPU 26. The signal receiving CPU 26 determines whether the tire pressure is normal or abnormal by comparing the detected tire pressure Pm with the predetermined alarm tire pressure.

As mentioned before, the signal receiving device 12 includes the first alarm 30, as the second alarm 32 and the third alarm 34. The signal receiving device 26 memorizes a predetermined first alarm tire pressure P1 of the first alarm 30, a predetermined second alarm tire pressure P2 of the second alarm 32, and a predetermined third alarm tire pressure P3 of the third alarm 34 (P1>P2>P3). When the detected tire pressure Pm is equal to or lower than the first alarm tire pressure P1, the first alarm 30 issues an alarm with a light or a buzzer. When the detected tire pressure Pm further decreases and is equal to or lower than the second alarm tire pressure P2 and the third alarm tire pressure P3, the second alarm 32 and the third alarm 34 in order issue alarms with a light or a buzzer. From the first alarm tire pressure P1 to the third alarm tire pressure P3 are set to be, for example, 0.15 MPa, 0.07 MPa, and 0 MPa respectively. Consequently, the first alarm indicates that the tire pressure is in the early stage of decreasing of the tire pressure, and the second alarm indicates that the tire is punctured. Furthermore, the third alarm shows that the tire pressure becomes completely zero. Incidentally, the number of alarms should not be limited to three. It is available to be one or two, and also available to be four or more. Also the third alarm tire pressure can be set to a little higher value than zero.

Since the signal sending device 10 is deposited in the wheel, as mentioned above, it is driven by the contained battery 14. The signal sending device 10 consumes rather higher electric power, particularly when the signal sending unit 20 sends the electric wireless signal from the sending antenna 22. Therefore, it is desirable to send the detected tire pressure Pm intermittently and to make the signal sending interval longer, in order to maintain longer life of the battery 14. When the signal sending interval is longer, however, it is possible for a longer time to pass until the next signal is sent after the tire pressure becomes lower than the predetermined alarm tire pressure. In such a case, the signal receiving device 12 can not receive the electric signal. Then, the signal receiving device 12 can not issue an alarm swiftly, when the tire pressure is abnormal.

The pressure monitor of this embodiment sends an electric signal indicating detected tire pressure Pm periodically at a predetermined constant interval ΔT, and sends an electric signal indicating detected tire pressure Pm when a decreasing rate of the detected tire presuure Pm is equal to or more than a predetermined standard value. Then the life of the contained battery 14 can be lengthened, and at the same time the abnormality of the tire pressure can be communicated with swiftness and reliability. This characteristic of the embodiment is explained in detail as follows.

Figure 2:
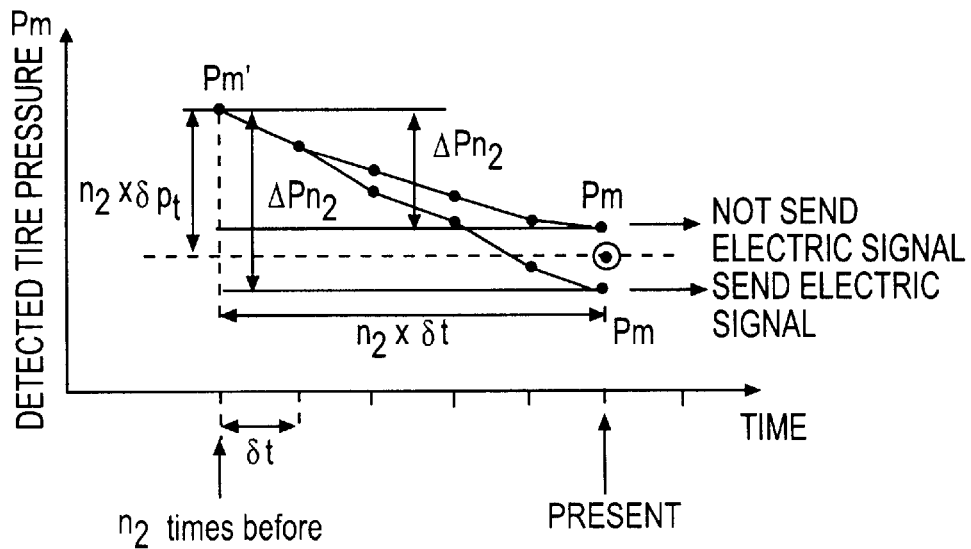
FIG. 2 is a graph showing a detected tire pressure Pm and how to determine a case of sending or not sending an electric signal from the signal sending device of the embodiment of the invention.

FIG. 2 shows the relationship between the changing condition of the detected tire pressure Pm and how to determine sending or not sending of the detected tire pressure Pm. As shown in FIG. 2, the detected tire pressure Pm is detected at a predetermined unit of time δt (<ΔT). Incidentally, the predetermined unit of time &t is preferably from 5 to 30 seconds, more preferably 15 seconds, and the predetermined interval ΔT is preferably from 5 to 30 minutes, more preferably 10 minutes. At the present time the detected tire pressure is Pm. When it is at the time before n2 times of the detection of the tire pressure, that is n2×δt (=standard time) before, the detected tire pressure is Pm'. The difference of the tire pressure between Pm' and Pm is, here, set to be ΔPn2. The introduction of a predetermined standard value δpt is described later. When the difference of the tire pressure ΔPn2 is equal to or higher than n2×δpt (this means an average of a change in the value of the tire pressure in the standard time is equal to or higher than the predetermined standard value δpt), the sending of the detected tire pressure is executed.

The predetermined standard value δpt is determined as follows.

$$\Delta PMIN/n1 \leq \delta pt \leq \Delta PMAX/n1 \tag{1}$$

Figure 3:
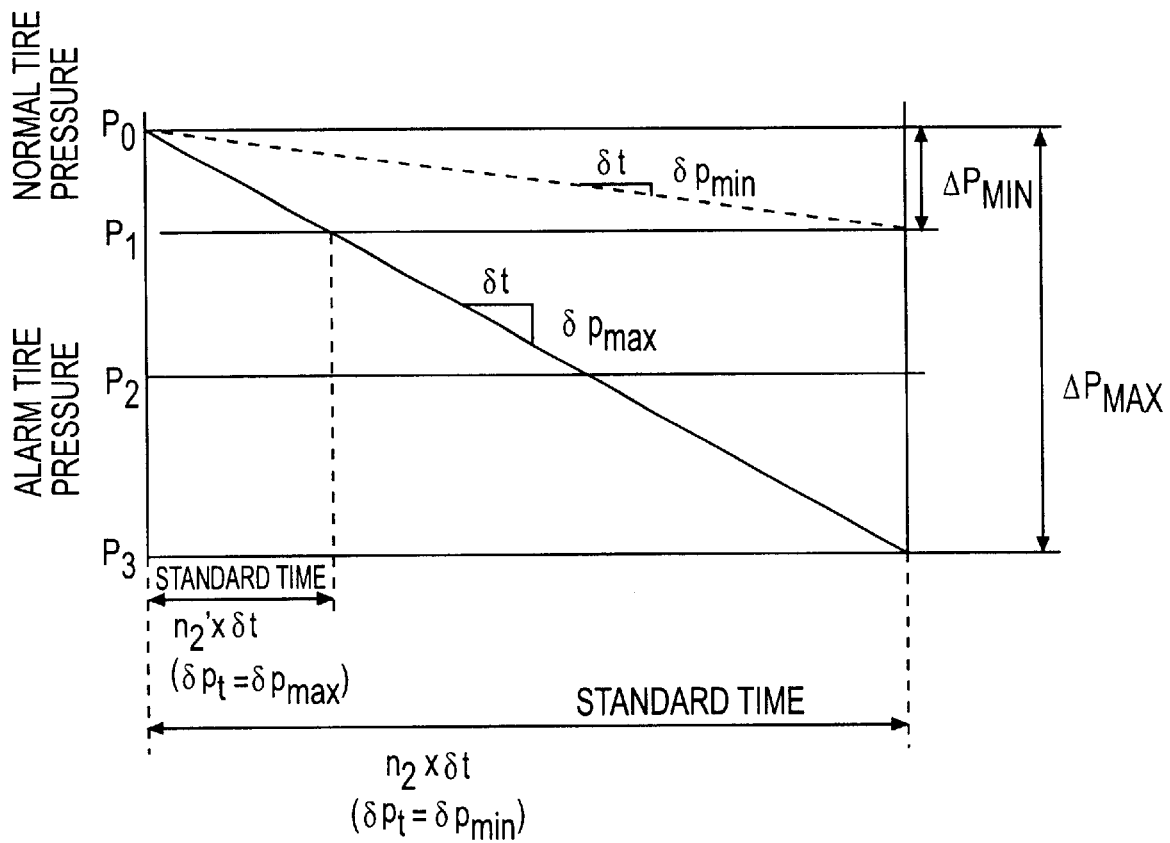
FIG. 3 is a graph showing the relationship between a tire pressure, alarm tire pressures and a standard time, according to the embodiment of the present invention.

Here, n1=ΔT/δt.
Δ PMIN is the minimum value of Δ Pi,i+1=Pi−Pi+1 (0~k−1). As mentioned above, P1, P2, and P3, are respectively the first, the second, and the third alarm tire pressures. P0 is the normal tire pressure or the set tire pressure. Δ PMAX is (P0−Pk), and k is the number of alarms. Then, in this embodiment k=3 as illustrated in FIG. 3.

As mentioned above, A PMIN indicates the minimum value of the difference ΔP0, 1 of the tire pressure between the normal tire pressure P0 and the first alarm tire pressure P1, the difference ΔP1,2 between the first tire pressure P1 and the second alarm tire pressure P2, and the difference $\Delta$P2,3 between the second tire pressure P2 and the third alarm tire pressure P3. $\Delta$PMAX indicates the different value between the normal tire pressure P0 and the third alarm tire pressure P3. Hereinafter, $\Delta$PMIN /n1 is expressed as $\delta$pmin and $\Delta$PMAX/n1 is expressed as $\delta$pmax.

According to the inequality (1), when the detected tire pressure Pm decreases as the rate of $\delta$pt/$\delta$t during the periodical sending interval $\Delta$T, the predetermined standard value $\delta$pt is determined to be the value by which the detected tire pressure Pm is at least lower than one of P1, P2, and P3. Therefore, in this embodiment, the signal receiving device 12 can receive the electric wireless signal indicating the detected tire pressure Pm, in the condition that the alarm is necessary by the periodical sending and temporary sending of the signal sending device 10, when the change in the value of the detected tire pressure Pm in the predetermined unit time $\delta$t is equal to or more than the standard value $\delta$pt. Consequently, in this pressure monitor of the embodiment, the signal receiving device 12 can swiftly issue an alarm when the tire pressure becomes to be in an abnormal condition, even though in the midterm between the periodical signal sending times.

Incidentally, if the standard value $\delta$pt is set to be $\delta$pmin, that is the minimum value of the inequality (1), the changing value of the detected tire pressure in the unit time is equal to or more than the standard value $\delta$pt, the signal sending of the detected tire pressure is conducted without fail. Then, by setting $\delta$pt=$\delta$pmin, the signal receiving device 12 can issue an alarm with higher reliability at any time between the periodical sending interval, when the tire pressure is not normal.

Concerning the above-mentioned n2, n2 can be set in the range satisfying the inequality (2).

$$0 < n2 \leq n1 \quad (2)$$

If n2 is set as satisfying the equation (3), the signal of the detected tire pressure Pm can be sent without fail, when the detected tire pressure Pm decreases by n2×$\delta$pt=$\Delta$PMIN or more in the standard time n2×$\delta$t.

$$n2 = \Delta PMIN/\delta pt \quad (3)$$

In FIG. 3, the solid line shows the decreasing condition of the detected tire pressure Pm when Pm is originally set to be the normal tire pressure P0, and decreases at the rate of $\delta$pmax per $\delta$t. In the same way, the dotted line shows the decreasing condition of the detected tire pressure Pm when Pm is initially set to be the normal tire pressure P0, and decreases at the rate of $\delta$pmin per $\delta$t. That is, the solid line and the dotted line in the case of $\delta$pt=$\delta$pmax, and $\delta$pt=$\delta$pmin respectively indicate the changing condition of the detected tire pressure Pm which is sent at every time when the tire pressure Pm is detected. Incidentally, in FIG. 3 $\delta$pmin is supposed to be the difference (P0–P1) between the normal tire pressure P0 and the first alarm tire pressure P1.

When n2 is set to be $\Delta$PMIN/$\delta$pt according to the equation (3), n2×$\delta$t changes by the standard value $\delta$pt. That is, n2×$\delta$t is the minimum when $\delta$pt=$\delta$pmax, and the maximum when $\delta$pt=$\delta$pmin. As shown in the solid line in FIG. 3, the detected tire pressure Pm changes $\Delta$PMIN in the time n2×$\delta$$\delta$t, and in the dotted line the detected tire pressure Pm changes $\Delta$PMIN within the time n2'×$\delta$t. This means, if n2 is set to be $\Delta$PMIN/$\delta$pt, the detected tire pressure Pm can be sent without fail irrespective of the standard value $\delta$pt, in the case that Pm changes by $\Delta$PMIN.

As mentioned above, $\Delta$PMIN is set to be the minimum value of the difference between the normal tire pressure P0 and the first alarm tire pressure P1, the difference between the first alarm tire pressure P1 and the second alarm tire pressure P2, and so on. Consequently, if n2 is set to be $\Delta$PMIN/$\delta$pt, the alarm is issued with reliability when the detected tire pressure Pm decreases and reaches one of the alarm tire pressures. Consequently, for example, in the case that $\Delta$PMIN is equal to (P0–P1) as illustrated in FIG. 3, the first alarm is issued without fail when the detected tire pressure reaches the first alarm tire pressure P1. The abnormality of the tire pressure can thus be detected in the initial stage. Furthermore, if n2 is set to be satisfying 0<n2<$\Delta$PMIN/$\delta$pt, the signal of the detected tire pressure Pm can be sent, when the detected tire pressure Pm changes by the value of less than $\Delta$PMIN. Then, the signal receiving device 12 can issue an alarm with greater reliability.

Figure 4:
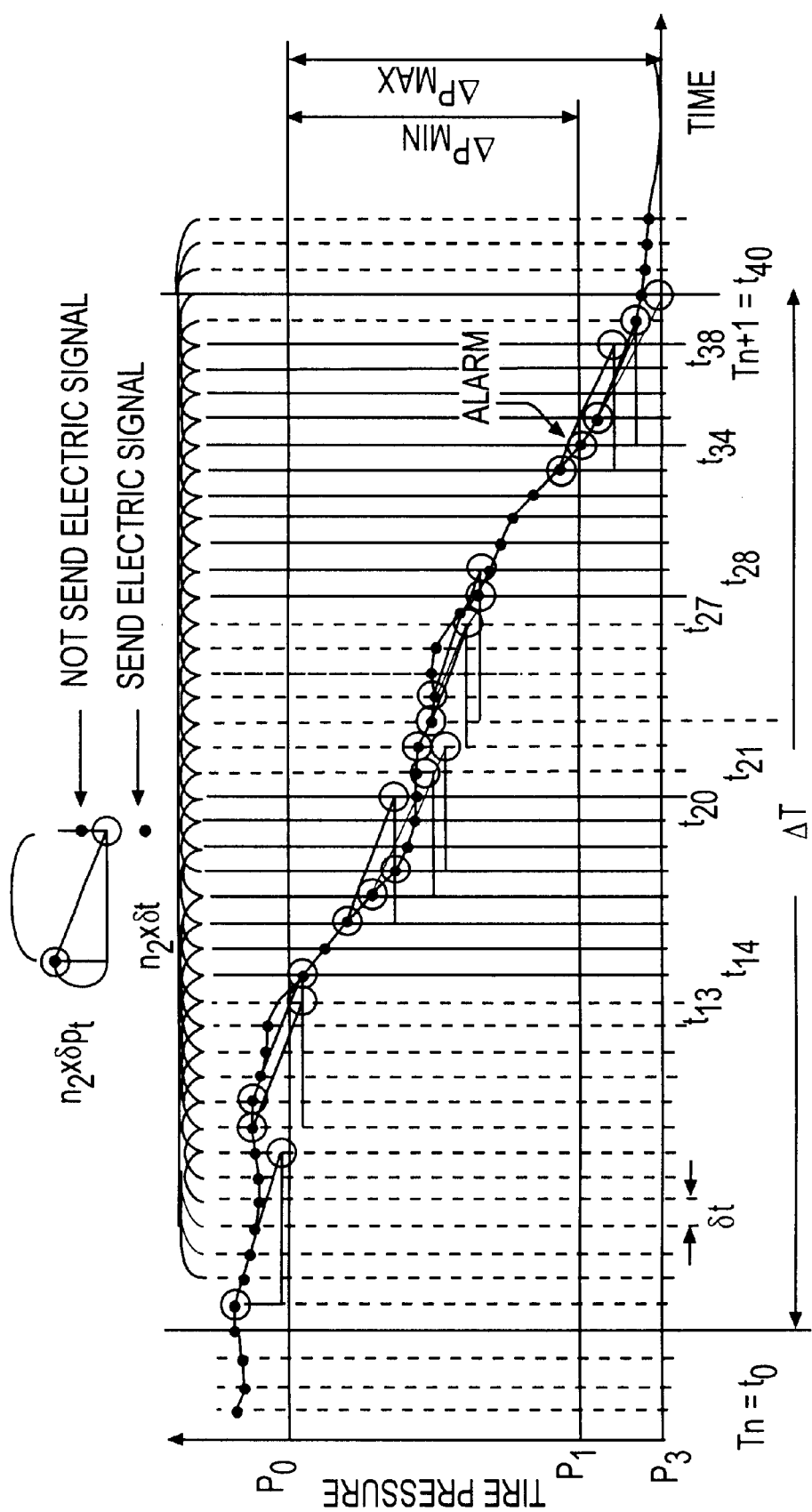
FIG. 4 is a graph showing a detected tire pressure Pm and at what time the pressure monitor issues an alarm or not.

Referring to FIG. 4, one example of the changing detected tire pressure Pm is shown, and initially the detected tire pressure Pm is more than the normal tire pressure P0 and gradually reduces to the value below the first alarm tire pressure P1. Finally, Pm goes down toward the third alarm tire pressure P3. This figure shows when the detected tire pressure is sent to the signal receiving device 12 or not. In FIG. 4, the second alarm tire pressure P2 is omitted for the convenience of explanation, and $\Delta$PMIN is supposed to be (P0–P1). Furthermore, $\delta$pt=$\delta$pmin, n1=40, n2=5 (<n1= $\Delta$PMIN/$\delta$pt) in FIG. 4, and the vertical solid line shows that the detected tire pressure Pm is sent at the time of each solid line, and the dotted line shows respectively that Pm is not sent at the time of each dotted line respectively. Incidentally, Pm is sent periodically at the time Tn (=t0), and next at the time Tn+1 (=t40), and the interval $\Delta$T between the time Tn and Tn+1 is 40×$\delta$t.

Referring to FIG. 4, after the periodical sending is issued at the time T0, the sending continues to be not executed until the time t13, because the change in the value of the tire pressure $\Delta$Pn2 in the standard time n2×$\delta$t (=5×$\delta$t) is less than n2×$\delta$pt. At the next time t14, $\Delta$Pn2 reaches n2×$\delta$pt, and the condition here $\Delta$Pn2 is equal to or more than n2×$\delta$pt continues until the time t20. Then, the detected tire pressure Pm is sent from t14 through t20. In this stage, since Pm is not equal to nor less than the first alarm tire pressure, the signal receiving device 12 does not issue an alarm.

At the time t21, the changing value $\Delta$Pn2 of the detected tire pressure Pm is less than n2×$\delta$pt. This condition continues until t27. Therefore, during the time from t21 to t27 the signal sending of the detected tire pressure Pm is not conducted.

From the time t38 the changing value $\Delta$Pn2 of the detected tire pressure Pm becomes again lower than n2×$\delta$pt. Although at the time t40 the change in the value $\Delta$Pn2 is less than n2×$\delta$pt, the signal sending device sends the electric signal, because t40 (=Tn+1) is the predetermined periodical sending time.

As explained above, according to this embodiment the electric signal of the detected tire pressure Pm is sent at the predetermined sending interval $\Delta$T, and is also sent when the change in the value of the tire pressure in the unit time $\delta$t is equal to or more than the predetermined standard value $\delta$pt. Consequently, the signal sending is executed when the detected tire pressure is equal to or lower than anyone of the alarm tire pressures. Therefore, the abnormality of the tire pressure is communicated swiftly and reliably. On the contrary, only periodical sending is done when the tire pressure does not decrease so much as mentioned above. Therefore, the signal sending unit 20 restrains the sending frequency, and the electric power consumed by the battery 14 can be reduced. The pressure monitor of this embodiment, thus, enables the contained battery 14 to have longer life, and the signal receiving device 12 to issue an alarm when the tire pressure is equal to or lower than the predetermined value.

Furthermore, in this embodiment n2 and the predetermined standard value apt, which determines whether the sending should be done or not, are determined on the basis of the above-mentioned inequalities (1) and (2). Therefore, the signal of the detected tire pressure Pm is sent when the detected tire pressure Pm is equal to or less than the predetermined alarm tire pressure and the sending frequency can be restrained to the minimum. Consequently, by this embodiment the consumed electric power of the pressure monitor is restrained and this results that the contained battery 14 gains longer life.

Furthermore, if the difference between the normal (or setting) tire pressure P0 and the first alarm tire pressure P1 (=the closest to P0) is set to be ΔPMIN as shown in FIGS. 3 and 4, the first alarm can be issued when the tire pressure is equal to or lower than the first alarm tire pressure P1. The abnormality of the tire pressure can thus be detected in the early stage.

What is claimed is:

1. A pressure monitor for a vehicle tire comprising:
    a signal sending device, including a tire pressure sensor and a battery, for sending an electric signal in response to a tire pressure detected by said tire pressure sensor; and a signal receiving device for receiving the electric signal,
    wherein said signal sending device sends electric signals at predetermined sending intervals and sends an electric signal if a change in the value of the tire pressure in a predetermined unit of time is equal to or more than a predetermined standard value;
    wherein said signal receiving device further comprises at least one alarm for issuing an alarm on the basis of comparing the tire pressure detected by said tire pressure sensor with a predetermined alarm tire pressure, and said signal receiving device issues an alarm when the detected tire pressure is equal to or less than the predetermined alarm tire pressure; and
    wherein the standard value is determined on the basis of the predetermined sending interval and the predetermined alarm tire pressure.

2. The pressure monitor for a vehicle tire according to claim 1, wherein said signal sending device sends the electric signal to said signal receiving device if an average of the change in the value of the tire pressure in a standard time is equal to or more than the standard value, the standard time being determined to be equal to n2×δt by selecting a value n2 which is equal to or less than n1 (=ΔT/δt) calculated from the predetermined sending interval ΔT and the predetermined unit time δt, and multiplying the value n2 by the predetermined unit time δt.

3. The pressure monitor for a vehicle tire according to claim 1, wherein a plurality of alarm tire pressures, each having a different value, are provided in said signal receiving device and the standard value is determined on the basis of the tire pressure which is equal to or more than the minimum value among a difference between a predetermined normal tire pressure and the highest alarm tire pressure and the differences between pairs of successive alarm tire pressures.

4. The pressure monitor for a vehicle tire according to claim 2, wherein a plurality of alarm tire pressures, each having a different value, are provided in said signal receiving device and the standard value is determined on the basis of the tire pressure which is equal to or more than the minimum value among a difference between a predetermined normal tire pressure and the highest alarm tire pressure and the differences between pairs of successive alarm tire pressures.

5. The pressure monitor for a vehicle tire according to claim 1, wherein a plurality of alarm tire pressures are provided in said signal receiving device and the standard value is determined on the basis of the tire pressure which is equal to or less than the difference between the predetermined normal tire pressure and the lowest alarm tire pressure.

6. The pressure monitor for a vehicle tire according to claim 2, wherein a plurality of alarm tire pressures are provided in said signal receiving device and the standard value is determined on the basis of the tire pressure which is equal to or less than the difference between the predetermined normal tire pressure and the lowest alarm tire pressure.

7. A method of sending an electric signal of a signal sending device in a pressure monitor for a vehicle tire comprising the signal sending device and a signal receiving device, comprising:
    detecting a tire pressure at predetermined time unit intervals;
    sending electric signals of the tire pressures at predetermined intervals and sending an electric signal if a change in the value of the tire pressure in the predetermined time unit is equal to or more than a predetermined standard value,
    wherein said signal receiving device issues an alarm when the detected tire pressure is equal to or less than a predetermined alarm time pressure; and
    wherein the electric signal from said signal sending device to said signal receiving device is sent if an average of the change in the value of the tire pressure in a standard time is equal to or more than the standard value, the standard time being determined to be equal to n2×δt by selecting a value n2 which is equal to or less than n1(=ΔT/δt) calculated from the predetermined sending interval ΔT and the predetermined unit time δt, and multiplying the value n2 by the predetermined unit time δt.

8. The method as set forth in claim 7, wherein the standard value is determined on the basis of the tire pressure which is equal to or more than the minimum value among difference between a predetermined normal tire pressure and the highest alarm tire pressure and the differences between pairs of successive alarm tire pressures of a plurality of alarm tire pressures.

9. The method as set forth in claim 7, wherein the standard value is determined on the basis of the tire pressure which is equal to or more than the minimum value among difference between a predetermined normal tire pressure and the highest alarm tire pressure and the differences between pairs of successive alarm tire pressures of a plurality of alarm tire pressures.

10. The method as set forth in claim 7, wherein the standard value is determined on the basis of the tire pressure which is equal to or less than the difference between the predetermined normal tire pressure and the lowest alarm tire pressure of a plurality of alarm tire pressures.

11. The method as set forth in claim 7, wherein the standard value is determined on the basis of the tire pressure which is equal to or less than the difference between the predetermined normal tire pressure and the lowest alarm tire pressure of a plurality of alarm tire pressures.

* * * * *